April 16, 1929.  M. AITKEN  1,708,928
ICE CREAM SCOOP
Filed May 19, 1925
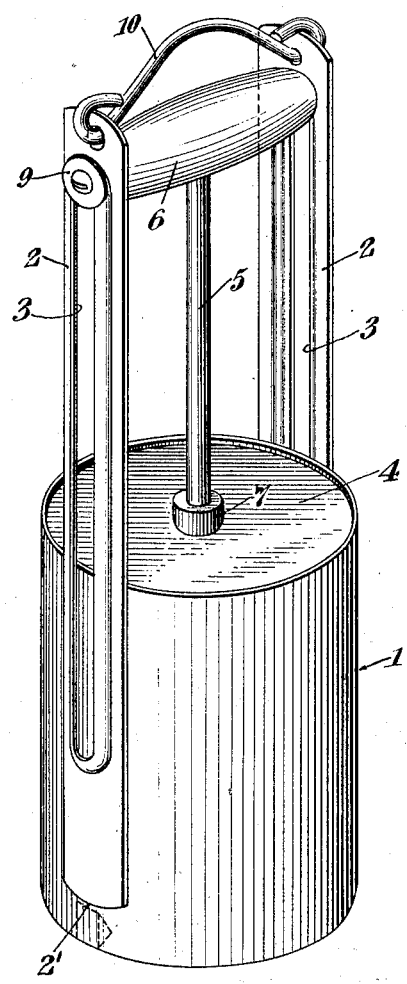
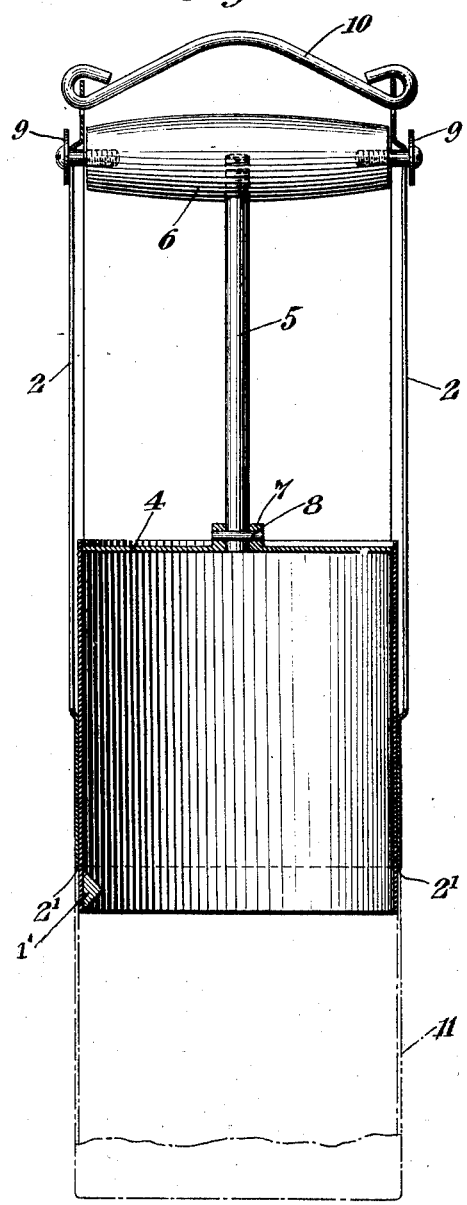
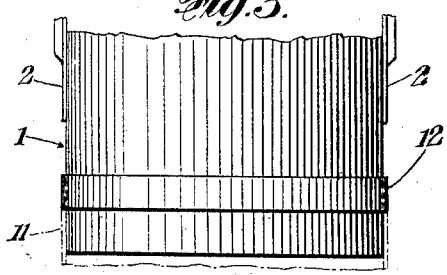
Inventor
Malcolm Aitken
By his Attorneys
Kenyon & Kenyon Patented Apr. 16, 1929.

1,708,928

UNITED STATES PATENT OFFICE.

MALCOLM AITKEN, OF STAMFORD, CONNECTICUT.

ICE-CREAM SCOOP.

Application filed May 19, 1925. Serial No. 31,271.

My invention relates to ice cream scoops which are designed to ladle or dip out cream in prescribed quantities.

Its main object is to provide an implement which, on one thrust into a bulk container, can scoop out the particular measure of cream for which it is adapted, and then discharge it into a suitable receptacle by what is practically a single operation.

Another object of the invention is to furnish a means for supplying cream with a minimum of handling, and so promote the sanitary dispensing of the same.

Other objects are to economize the time now taken up by the use of the old methods of serving, and to reduce the waste of cream incidental thereto.

In the drawings accompanying this specification, and forming part hereof, I have shown a preferred embodiment of my invention, although I do not limit myself to the exact construction shown. My invention will be readily understood by reference to these drawings, in which Figure 1 is a perspective view of my improved scoop;

Figure 2 is a vertical section of the same inserted in the open end of a container, the latter being shown in dot and dash lines; and Figure 3 illustrates, in section, a modification of my invention.

Similar numerals of reference indicate like parts in the different figures.

Referring to Figs. 1 and 2 of the drawings, 1 indicates a circular scoop. Attached to its sides are upright members 2, provided with guideways 3. Fitting snugly into the top of the scoop is a plunger 4, to which is attached plunger rod 5, the latter being connected to plunger bar 6. The circumference of the plunger is substantially the same as that of the inside of the scoop so as to form a close contact therewith but be freely slidable therein. The rod 5 is connected to the plunger in any way desired, the connection illustrated herein being by hub 7 and pin 8. The bar 6 has extensions which reach into guideways 3, the heads 9 of which are enlarged to prevent their slipping through the same. 10 is a handle of any suitable construction, and 11 indicates a circular container of the ordinary and well known type in common use for carrying cream and the like. Near the base of the cylinder or scoop 1 I preferably attach a small triangular piece of metal 1'. When the cream is being forced out of the cylinder this member 1' makes an opening along the side of the cream which forms an exit passage for the air in the container so that the cream will fall into the same more quickly.

In constructing my improved scoop in the way described above, I have found it advantageous to carry the members 2 down to within about half an inch of the lower open end of the scoop, so that their extremities, jutting out slightly from the body thereof, will form stops 2', the purpose of which is described hereinafter.

In Fig. 3 is shown a modification of my device which has to do only with a substitute for the stops 2'. In this figure the numeral 12 indicates a band or ring, which is spot-welded to the scoop 1, or affixed thereto in some other way. Like the stops 2' it is located within about half an inch of the bottom of the plunger, and, when it takes the place of the said stops, the members 2 need not be carried beyond the middle of the scoop, or even so far.

In use my scoop is taken in one hand, grasped by the handle and plunger bar, and thrust into the cream in bulk. The thin walls of the scoop cleave the mass without any perceptible pressure, and can be instantly withdrawn with its full contained quota of cream. Its open end is then placed within a standard container of the proper measure, the stops 2', or the ring 12, as the case may be, resting on the edge of the container; the handle is released, two or three fingers placed on top of the plunger bar, which, being forced downward along the guideways, depresses the plunger, causing the latter to discharge its contents into the container.

My device is preferably constructed of metal, and can be made in standard sizes of say from a pint or half a pint up.

An important feature of my device is the provision of a seat,—formed either by the stops 2' or the ring or band 12,—which rests on the edge of the container when the scoop is about to be freed of its contents. This seat gives to the scoop the stability needed to enable the emptying operation to be performed with certainty and by one hand. Lacking this, it would be necessary to hold the scoop suspended over a container with one hand, and with the other force the plunger downward, this method being attended with the risk of upsetting the container and perhaps losing the cream being discharged from the scoop, owing to the unsteadiness of the operator or the lack of co-operation between the scoop and container, or both.

It will be seen, therefore, that I have devised an improved scoop, simple in construction and certain in operation, which may be operated by one hand.

As stated above, I do not limit myself to the exact construction described and illustrated herein, as various changes in detail may be made therein without departing from the spirit of the invention or the scope of the claims appended hereto.

What I claim as new and desire to secure by Letters Patents is:

1. In a device for serving ice-cream, a scoop, upright slotted members affixed to said scoop, the upper part of which members extends above the scoop, their lower ends terminating short of the end of the scoop and projecting slightly therefrom to form rests, a plunger, a rod connected to the plunger, and a bar connecting said rod and guide members, the depression of the bar along the slotted guide members causing the plunger to move through the scoop to discharge the contents thereof, substantially as described.

2. In a device for serving ice-cream, a scoop, a member projecting from the interior of the scoop near the base thereof, upright slotted members affixed to said scoop, the upper part of which members extends above the scoop, their lower ends terminating short of the end of the scoop and projecting slightly therefrom to form rests, a plunger, a rod connected to the plunger, and a bar connecting said rod and guide members, the depression of the bar along the slotted guide members causing the plunger to move through the scoop to discharge the contents thereof, substantially as described.

3. In a device for serving ice-cream, a scoop, upright members attached to said scoop, said members having elongated slots, a plunger, a rod and bar connected to the plunger, the bar having headed extensions movable in said slots, and the lower extremities of the upright members terminating short of the end of the scoop and projecting slightly from the sides thereof to form rests, the whole being constructed and combined so that the depression of the bar along the said slots will cause the plunger to discharge the contents of the scoop into a receptacle contacting with said rests, substantially as and for the purpose described.

4. In a device for serving ice-cream, a scoop, upright members attached to said scoop, said members having elongated slots, a member projecting from the interior of the scoop near the base thereof, a plunger, a rod and bar connected to the plunger, the bar having headed extensions movable in said slots, and the lower extremities of the upright members terminating short of the end of the scoop and projecting slightly from the sides thereof to form rests, the whole being constructed and combined so that the depression of the bar along the said slots will cause the plunger to discharge the contents of the scoop into a receptacle contacting with said rests, substantially as and for the purpose described.

In testimony whereof, I have signed my name to this specification.

MALCOLM AITKEN.